(12) United States Patent
Mital et al.

(10) Patent No.: US 9,110,957 B2
(45) Date of Patent: Aug. 18, 2015

(54) DATA MINING IN A BUSINESS INTELLIGENCE DOCUMENT

(75) Inventors: Vijay Mital, Redmond, WA (US); Gary Shon Katzenberger, Redmond, WA (US); Darryl Rubin, Redmond, WA (US); David George Green, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 700 days.

(21) Appl. No.: 12/971,638

(22) Filed: Dec. 17, 2010

(65) Prior Publication Data

US 2012/0158643 A1   Jun. 21, 2012

(51) Int. Cl.
G06F 7/00      (2006.01)
G06F 17/00     (2006.01)
G06F 17/30     (2006.01)

(52) U.S. Cl.
CPC ................................ G06F 17/30539 (2013.01)

(58) Field of Classification Search
CPC ................ G06F 17/30539; G06F 17/30572; G06F 2216/03; G06F 17/30592
USPC ......... 707/600, 602, 603, 722, 776; 705/7.11, 705/7.29, 28, 301, 328, 342
See application file for complete search history.

(56) References Cited

U.S. PATENT DOCUMENTS

| | | | |
|---|---|---|---|
| 4,633,430 A | 12/1986 | Cooper | |
| 5,669,007 A | 9/1997 | Tateishi | |
| 6,691,100 B1 | 2/2004 | Alavi et al. | |
| 6,865,720 B1 | 3/2005 | Otani et al. | |
| 6,931,589 B2 | 8/2005 | Baltsan et al. | |
| 7,028,306 B2 | 4/2006 | Boloker et al. | |
| 7,263,663 B2 | 8/2007 | Ballard et al. | |
| 7,315,861 B2 | 1/2008 | Seibel et al. | |
| 7,343,585 B1 | 3/2008 | Lau et al. | |
| 7,349,947 B1 | 3/2008 | Slage et al. | |
| 7,440,902 B2 | 10/2008 | Greenstein et al. | |
| 7,506,243 B2 | 3/2009 | Kotler et al. | |
| 7,603,620 B2 | 10/2009 | Erol et al. | |
| 7,752,314 B2 | 7/2010 | Trevor et al. | |
| 7,752,536 B2 | 7/2010 | Megiddo et al. | |
| 7,802,230 B1 | 9/2010 | Mendicino et al. | |
| 7,900,111 B1 * | 3/2011 | Kim et al. | 714/739 |
| 7,908,186 B2 * | 3/2011 | Gabelmann et al. | 705/28 |

(Continued)

OTHER PUBLICATIONS

"Document Processing System"—Published Date: Nov. 16, 2007; http://www.wolfram.com/products/mathematica/analysis/content/DocumentProcessingSystems.html.

(Continued)

*Primary Examiner* — Md. I Uddin
(74) *Attorney, Agent, or Firm* — Kevin Sullivan; Kate Drakos; Micky Minhas

(57) ABSTRACT

A business intelligence document provides functionality for testing a hypothesis on aggregated data in a business intelligence document (e.g., a spreadsheet-like document), wherein one or more of the input data values and transformation properties are designated as constrained (e.g., invariant or constrained within a range, set, enumeration, or domain). The hypothesis, which is articulated as a data mining assertion, is input through the user interface of the business intelligence document (e.g., via an expression interface or properties of a row, column, or cell) and solved over the aggregated data. The solution is then presented through the user interface of the spreadsheet-like document, such as in a table, graph, histogram, etc.

19 Claims, 6 Drawing Sheets

(56) References Cited

U.S. PATENT DOCUMENTS

| | | | |
|---|---|---|---|
| 8,135,655 B2 | 3/2012 | Oaten et al. | |
| 8,332,772 B2 | 12/2012 | Janzen et al. | |
| 8,473,473 B2 | 6/2013 | Wang et al. | |
| 8,589,172 B2* | 11/2013 | Alonso et al. | 704/275 |
| 8,635,211 B2* | 1/2014 | Jiang et al. | 707/723 |
| 2001/0047372 A1 | 11/2001 | Gorelik et al. | |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0169658 A1 | 11/2002 | Adler | |
| 2002/0191199 A1 | 12/2002 | Imada et al. | |
| 2003/0040962 A1 | 2/2003 | Lewis | |
| 2003/0041104 A1 | 2/2003 | Wingard et al. | |
| 2003/0144868 A1 | 7/2003 | MacIntyre et al. | |
| 2004/0015481 A1 | 1/2004 | Zinda | |
| 2004/0098358 A1 | 5/2004 | Roediger | |
| 2004/0153992 A1 | 8/2004 | Molina-Moreno et al. | |
| 2004/0162842 A1 | 8/2004 | Ono et al. | |
| 2004/0181519 A1 | 9/2004 | Anwar | |
| 2005/0004911 A1 | 1/2005 | Goldberg et al. | |
| 2005/0043961 A1 | 2/2005 | Torres et al. | |
| 2005/0187809 A1* | 8/2005 | Falkenhainer | 705/9 |
| 2005/0231392 A1 | 10/2005 | Meehan et al. | |
| 2006/0074882 A1 | 4/2006 | Scherer et al. | |
| 2006/0080400 A1 | 4/2006 | Guha | |
| 2007/0038657 A1* | 2/2007 | Denton et al. | 707/101 |
| 2007/0046664 A1 | 3/2007 | Raspl et al. | |
| 2007/0061711 A1 | 3/2007 | Bodin et al. | |
| 2007/0112714 A1 | 5/2007 | Fairweather | |
| 2007/0124285 A1 | 5/2007 | Wright et al. | |
| 2007/0136326 A1 | 6/2007 | McClement et al. | |
| 2007/0179941 A1 | 8/2007 | Huang et al. | |
| 2007/0185746 A1 | 8/2007 | Chieu et al. | |
| 2007/0250764 A1 | 10/2007 | Jiang et al. | |
| 2007/0265995 A1 | 11/2007 | Remington et al. | |
| 2007/0294614 A1 | 12/2007 | Jacquin et al. | |
| 2008/0040346 A1* | 2/2008 | Aggarwal et al. | 707/6 |
| 2008/0058969 A1 | 3/2008 | Nixon et al. | |
| 2008/0178083 A1 | 7/2008 | Bergman et al. | |
| 2008/0183710 A1 | 7/2008 | Serjeantson et al. | |
| 2008/0184140 A1 | 7/2008 | Koerner | |
| 2008/0189438 A1 | 8/2008 | Zimmerer et al. | |
| 2008/0195930 A1 | 8/2008 | Tolle | |
| 2008/0209314 A1 | 8/2008 | Sylthe et al. | |
| 2008/0215559 A1 | 9/2008 | Fontoura et al. | |
| 2008/0238925 A1 | 10/2008 | Meehan et al. | |
| 2008/0271127 A1 | 10/2008 | Naibo et al. | |
| 2008/0288889 A1 | 11/2008 | Hunt et al. | |
| 2008/0294996 A1 | 11/2008 | Hung et al. | |
| 2008/0306981 A1 | 12/2008 | Jiang et al. | |
| 2008/0307334 A1 | 12/2008 | Chaudhri et al. | |
| 2008/0319829 A1 | 12/2008 | Hunt et al. | |
| 2009/0037363 A1* | 2/2009 | Ari et al. | 707/1 |
| 2009/0049422 A1 | 2/2009 | Hage et al. | |
| 2009/0094674 A1 | 4/2009 | Schwartz et al. | |
| 2009/0100360 A1 | 4/2009 | Janzen et al. | |
| 2009/0100407 A1 | 4/2009 | Bouillet et al. | |
| 2009/0125553 A1 | 5/2009 | Dickinson | |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0225082 A1 | 9/2009 | Hargrove et al. | |
| 2009/0254971 A1 | 10/2009 | Herz et al. | |
| 2009/0287814 A1 | 11/2009 | Robertson et al. | |
| 2009/0300544 A1 | 12/2009 | Psenka et al. | |
| 2009/0312992 A1 | 12/2009 | Chen et al. | |
| 2009/0322739 A1 | 12/2009 | Rubin et al. | |
| 2009/0327878 A1 | 12/2009 | Grandison et al. | |
| 2010/0070448 A1 | 3/2010 | Omoigui | |
| 2010/0088258 A1 | 4/2010 | Oaten et al. | |
| 2010/0100561 A1 | 4/2010 | Cooper et al. | |
| 2010/0106853 A1 | 4/2010 | Kashiyama et al. | |
| 2010/0131255 A1 | 5/2010 | Beckman et al. | |
| 2010/0138753 A1 | 6/2010 | Riggs et al. | |
| 2010/0179951 A1* | 7/2010 | McPhail | 707/740 |
| 2010/0198697 A1 | 8/2010 | Brown et al. | |
| 2010/0205178 A1 | 8/2010 | Bush et al. | |
| 2010/0241620 A1 | 9/2010 | Manister et al. | |
| 2010/0287459 A1 | 11/2010 | Mital et al. | |
| 2011/0029636 A1 | 2/2011 | Smyth et al. | |
| 2011/0072046 A1 | 3/2011 | Chi | |
| 2011/0093430 A1 | 4/2011 | B'Far et al. | |
| 2011/0131253 A1 | 6/2011 | Peukert et al. | |
| 2011/0179020 A1 | 7/2011 | Ozzie et al. | |
| 2011/0231385 A1 | 9/2011 | Wang et al. | |
| 2011/0295795 A1 | 12/2011 | Venkatasubramanian et al. | |
| 2011/0295853 A1 | 12/2011 | Li et al. | |
| 2011/0314007 A1 | 12/2011 | Dassa et al. | |
| 2012/0158643 A1 | 6/2012 | Mital et al. | |
| 2012/0158644 A1 | 6/2012 | Mital | |
| 2012/0158732 A1 | 6/2012 | Mital | |
| 2012/0158754 A1 | 6/2012 | Mital | |
| 2012/0159312 A1 | 6/2012 | Mital | |
| 2012/0159333 A1 | 6/2012 | Mital | |
| 2012/0159465 A1 | 6/2012 | Mital | |

OTHER PUBLICATIONS

"How to Customize Ubuntu into your own custom distribution," Retrieved at <<http://www.linuxquestions.org/questions/ubuntu-63/how-to-customize-ubuntu-into-your-own-custom-distribution-663412/>>, Aug. 17, 2008, 10 pages.

"Introduction to the XML Pipeline Definition Language (XPL)"—Retrieved Date: Sep. 15, 2010; http://www.orbeon.com/orbeon/doc/reference-xpl-pipelines.

"Optimizing forms processing"—Retrieved Date: Sep. 15, 2010; http://www.movetonow.com/content/optimizing_forms_processing.

"Publishing applications to market place," Retrieved at <<https://help.creator.zoho.com/Publishing-applications-to-market-place.html>>, Retrieved Date Nov. 26, 2010, pp. 1-5.

"User Customization," Retrieved at <<http://docstore.mik.ua/orelly/perl3/tk/ch16_01.htm>>, Retrieved Date Nov. 26, 2010, pp. 1-4.

"Windows Azure and Cloud Computing," Retrieved at <<http://oakleafblog.blogspot.com/2010/09/windows-azure-and-cloud-computing-posts_09.html>>, Sep. 9, 2010, pp. 1-68.

Ayachit et al., "Customizing ParaView," Retrieved at <<http://www.itk.org/Wiki/images/7/77/Branding_paper.pdf>>, Oct. 2009, 3 pages.

Biddick, Michael, "Six Questions to Ask Before Buying End-to-End APM," Retrieved at <<http://www.networkcomputing.com/end-to-end-apm/6-questions-to-ask-before-buying-end-to-end-apm.php>>, Jun. 21, 2010, pp. 1-9.

Collins, J., "Using Innovation in Technology to Create New Business Models," Retrieved at <<http://www.theshiftonline.com/?p=666>>, Oct. 25, 2010, 3 pages.

Delaney, A., "Direct Data Feed Services," Retrieved at <<http://www.a-teamgroup.com/?dl_id=7460&dl_cm=on&dl_la=0&dl_ls=0>>, Jun. 2010, 8 pages.

Frisch, A. et al. "Streaming XML transformations using term rewriting"—Published Date: 2007; http://pauillac.inria.fr/~frisch/xstream/long.pdf.

Gardarin, G. et al. "XML-based Components for Federating Multiple Heterogeneous Data Sources" Lecture Notes in Computer Science—Published Date: 1999; http://dntt.free.fr/publi/er1999.pdf.

Janeiro, et al., "Improving the Development of Service-Based Applications Through Service Annotations," Retrieved at <<http://www.rn.inf.tu-dresden.de/uploads/Publikationen/AnnotationPaperWWW-Internet2009.pdf>>, 2009, 8 pages.

Jelinek, J. et al. "XML Visualization Using Tree Rewriting"—Published Date: 2004; http://mummy.intranet.gr/includes/docs/Conferences/_02_XMLvisualization-Jelinek-SCCG04.pdf.

Johnson, et al., "Building ETL Processes for Business Intelligence Solutions," Retrieved at <<http://www.ca.com/files/whitepapers/ca-erwin-building-etl-processes-sql-wp-us-en.pdf>>, Jul. 10, 2008, 6 pages.

McNee et al., "Creating Auction Ads for Marketplaces," Retrieved at <<http://e-articles.info/e/a/title/Creating-Auction-Ads-for-Marketplaces/>>, Apr. 2007, pp. 1-2.

(56) References Cited

OTHER PUBLICATIONS

Mostarda et al., "MU: an hybrid language for Web Mashups," Retrieved at <<http://em-up.googlecode.com/svn/wiki/papers/www2009.pdf>>, 2009, 10 pages.
Nagel, Nick, "Enterprise Data Modeling Using XML Schema," Retrieved at <<http://citeseerx.ist.psu.edu/viewdoc/download-?doi=10.1.1.135.6120&rep=rep1&type=pdf>>, 2007, 30 pages.
Page, S. "XSL Pipeline Processing"—Published Date: Jul. 2, 2007; http://www.usingxml.com/Transforms/XslPipelines.
Ravindran, Karthik, "Integrating LOB Systems with the Microsoft Office System," Retrieved at <<http://msdn.microsoft.com/en-us/library/bb896607.aspx>>Nov. 2007, pp. 1-18.
Spillner et al., "Flexible Human Service Interfaces," Retrieved at <<http://citeseerx.ist.psu.edu/viewdoc/download?doi=10.1.1.70.7734&rep=rep1&type=pdf>>, 2007, 7 pages.
Banerjee, Atanu, "The 2007 Microsoft Office System and Other Platform Technologies for Building Composite Applications", Retrieved at << http://msdn.microsoft.com/en-us/library/bb220802.aspx >>, Dec. 2006, pp. 14.
White, Colin J, "IBM enterprise analytics for the intelligent e-business", Retrieved at << http://sysdoc.doors.ch/IBM/bi.pdf >>,Sep. 2001, pp. 34.
"Square your search results with Google Squared", Retrieved at << http://googleblog.blogspot.com/2009/06/square-your-search-results-with-google.html >>, Jun. 2009, pp. 1-4.
"Quella Business Intelligence Package", Retrieved at << http://www.shareit.com/product.html?cookies=1&productid=300110398&affiliateid=200012751>>, p. 1.
"LeoStatistic—building histogram, curve fit, multivariate regression, data modeling software", Retrieved at << http://www.leokrut.com/leostatistic.html >>, Retrieved Date: Sep. 21, 2010, pp. 1-6.
"Document Processing Systems"; Nov. 16, 2007; Wolfram Mathematics; 2 pages.
"How to Customize Ubuntu into your own custom distribution"; Aug. 17, 2008; Linux Questions; 10 pages.
"Introduction to the XML Pipeline Definition Language (XPL)"; Retrieved Sep. 15, 2010; Orbeon Forms User Guide; 24 pages.
"LeoStatistic—building histogram, curve fit, multivariate regression, data modeling software"; retrieved Sep. 21, 2010; Leokrut.com; 6 pages.
"Optimizing forms processing"; retrieved Sep. 15, 2010; Thunderhead Now; 2 pages.
"Publishing applications to market place"; retrieved Nov. 26, 2010; Zoho Creator; 5 pages.
"Quella Business Intelligence Package"; retrieved Sep. 21, 2010; Digital River GmbH; 1 page.
"Square your search results with Google Squared"; Jun. 3, 2009; The Official Google Blog; 4 pages.
"User Customization"; retrieved Nov. 26, 2010; O'Reilly; 4 pages.
"Windows Azure and Cloud Computing"; Sep. 8, 2010; Oakleaf Systems; 68 pages.
Ayachit et al.; "Customizing ParaView" Oct. 2009; 3 pages.
Banerjee, A.; The 2007 Microsoft Office System and Other Platform Technologies for Building Composite Applications; Dec. 2006; 14 pages.
Biddick, M.; "Six Questions to Ask Before Buying End-to-End APM"; Jun. 21, 2010; Network Computing; 9 pages.
Collins, J.; "Using Innovation in Technology to Create New Business Models"; Oct. 25, 2010; The Shift Online; 3 pages.
Delaney, A.; "Direct Data Feed Services"; Jun. 2010; A-Team Group; 8 pages.
Frisch, A. et al.; "Streaming XML transformations using term rewriting"; Programming Language Technologies for XML (PLAN-X'07); 2007; 13 pages.
Gardarin, G. et al.; "XML-based Components for Federating Multiple Heterogeneous Data Source"; Lecture Notes in Computer Science; 1999; 14 pages.
Janeiro, J. et al.; "Improving the Development of Service-Based Applications Through Service Annotations"; Proceedings of IADIS WWW/Internet; 2009; pp. 367-374.
Jelinek, J. et al.; "XML Visualization Using Tree Rewriting"; Proceedings of the 20th Spring Conference on Computer Graphics; 2004; pp. 65-72.
Johnson, E. et al.; "Building ETL Processes for Business Intelligence Solutions Built on Microsoft SQL Server"; Jul. 10, 2008; CA ERwin; 6 pages.
McNee, B.; "Creating Auction Ads for Marketplaces"; Apr. 2007; 2 pages.
Mostarda, M. et al.; "MU: an hybrid language for Web Mashups"; 18th International World Wide Web Conference; Madrid Spain; 2009; 10 pages.
Nagel, N.; "Enterprise Data Modeling Using XML Schema"; Apr. 2008; Altova GmbH; 30 pages.
Page, S.; "XSL Pipeline Processing"; Jul. 2, 2007; 6 pages.
Ravindran, K.; "Integrating LOB Systems with the Microsoft Office System"; Nov. 2007; 18 pages.
Spillner, J. et al.; "Flexible Human Service Interfaces"; Proceedings of ICEIS (5); 2007; pp. 79-85.
White, C.; "IBM Enterprise Analytics for the Intelligent E-Business"; Sep. 2001 ; 34 pages.
"Non-final Office Action in U.S. Appl. No. 12/971,462", Mailed Date: Mar. 21, 2013, Filed Date: Dec. 17, 2010, 21 Pages.
"Final Office Action in U.S. Appl. No. 12/971,462", Mailed Date: Sep. 18, 2013, Filed Date: Dec. 17, 2010, 24 Pages.
"Non-final Office Action in U.S. Appl. No. 12/972,205", Mailed Date: Nov. 26, 2012, Filed Date: Dec. 17, 2010, 32 Pages.
"Final Office Action in U.S. Appl. No. 12/972,205", Mailed Date: Jun. 7, 2013, Filed Date: Dec. 17, 2010, 35 Pages.
"Non-final Office Action in U.S. Appl. No. 12/971,685", Mailed Date: Jul. 13, 2012, Filed Date: Dec. 17, 2010, 9 Pages.
"Final Office Action in U.S. Appl. No. 12/971,685", Mailed Date: Oct. 11, 2012, Filed Date: Dec. 17, 2010, 16 Pages.
"Non-final Office Action in U.S. Appl. No. 12/971,725", Mailed Date: Aug. 21, 2012, Filed Date: Dec. 17, 2010, 10 Pages.
"Final Office Action in U.S. Appl. No. 12/971,725", Mailed Date: May 1, 2013, Filed Date: Dec. 17, 2010, 14 Pages.
"Non-final Office Action in U.S. Appl. No. 12/971,782", Mailed Date: Jul. 13, 2012, Filed Date: Dec. 17, 2010, 7 Pages.
"Final Office Action in U.S. Appl. No. 12/971,782", Mailed Date: Jan. 31, 2013, Filed Date: Dec. 17, 2010, 10 Pages.
"Non-Final Office Action Issued in U.S. Appl. No. 12/971,685", Mailed Date: Apr. 24, 2014, Filed Date: Dec. 17, 2010, 15 Pages.
"Non-final Office Action Issued in U.S. Appl. No. 12/971,725", Mailed Date: Jun. 23, 2014, Filed Date: Dec. 17, 2010, 18 Pages.
"Non-final Office Action Issued in U.S. Appl. No. 12/971,782", Mailed Date: Apr. 10, 2014, Filed Date: Dec. 17, 2010, 10 Pages.
"Non-Final Office Action Issued in U.S. Appl. No. 12/972,249", Mailed Date: Jul. 31, 2014, Filed Date: Dec. 17, 2010, 30 Pages.
"Non Final Office Action Received in U.S. Appl. No. 12/971,685", Mailed Date: Nov. 20, 2014, 18 Pages.
"Final Office Action Received in U.S. Appl. No. 12/971,782", Mailed Date: Dec. 4, 2014, 13 Pages.

\* cited by examiner

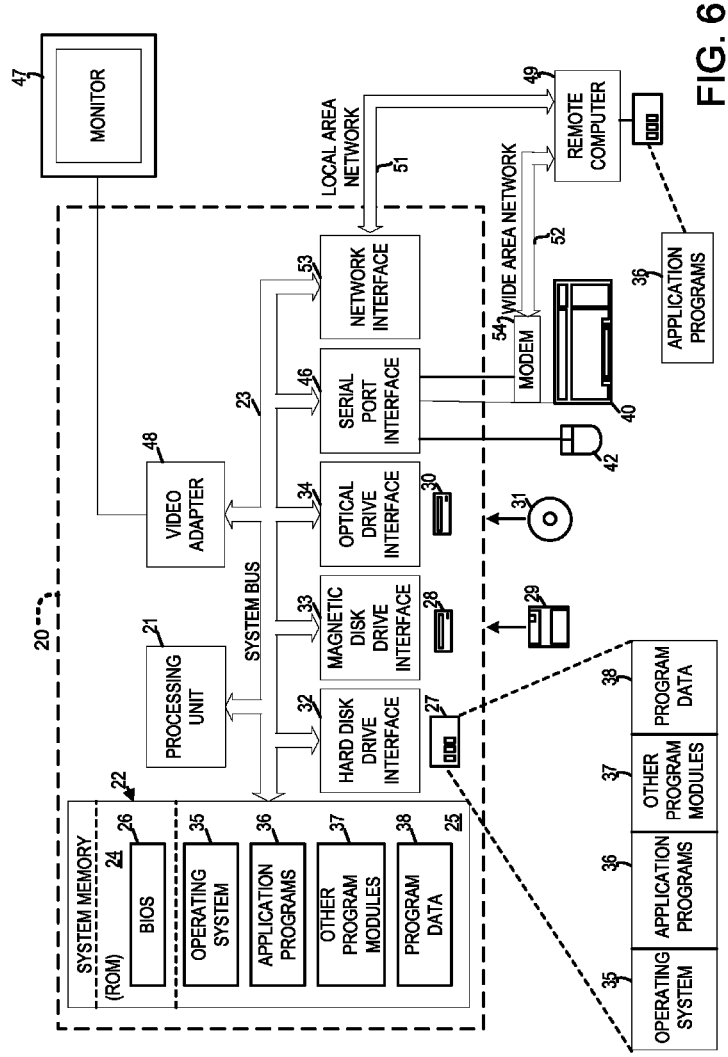

DATA MINING IN A BUSINESS INTELLIGENCE DOCUMENT

CROSS-REFERENCE TO RELATED APPLICATIONS

The present application is related to U.S. patent application Ser. No. 12/971,462 filed Dec. 17, 2010, entitled "Business Intelligence Document"; Ser. No. 12/971,685 filed Dec. 17, 2010, entitled "Data Feed Having Customizable Analytic and Visual Behavior"; Ser. No. 12/971,725 filed Dec. 17, 2010, entitled "Automated Generation of Analytic and Visual Behavior"; Ser. No. 12/971,782 filed Dec. 17, 2010, entitled "Business Application Publication"; Ser. No. 12/972,205 filed Dec. 17, 2010, entitled "Representation of an Interactive Document as a Graph of Entities"; and Ser. No. 12/972,249 filed Dec. 17, 2010, entitled "Representation of an Interactive Document as a Graph of Entities", all filed concurrently herewith and all of which are specifically incorporated by reference herein for all that they disclose or teach.

BACKGROUND

Business intelligence (BI) refers to a broad category of applications and technologies for gathering, storing, analyzing, and providing access to data to help information workers (IWs) make better business decisions. BI applications typically address activities such as decision support systems, querying, reporting, online analytical processing (OLAP), statistical analysis, forecasting, and data mining. BI tools allow IWs to create and execute a certain class of BI applications over a multi-dimensional data model, such a pivot table, a cube, or other hierarchical dimensional storage, thereby achieving sophisticated analytical results from increasingly complex data.

Data mining is a process that typically involves extracting patterns or relationships from data, particularly from large volumes of aggregated data. Often, the magnitude and complexity of the aggregated data makes it difficult for information workers (IW) to discover or discern patterns of interest within the data. Moreover, IWs may also be unable even to articulate which patterns might be of interest. Accordingly, the process of extracting useful patterns from increasingly copious and complex data presents a significant challenge.

SUMMARY

Implementations described and claimed herein address the foregoing problems by providing functionality for testing a hypothesis on aggregated data in a business intelligence (BI) document (e.g., a spreadsheet-like document), wherein one or more of the input data values and transformation properties are designated as constrained (e.g., invariant or constrained within a range, set, enumeration, or domain). The hypothesis, which is articulated as a data mining assertion, is input through the user interface of the BI document (e.g., via an expression interface or properties of a row, column, or cell) and solved over the aggregated data. The solution is then presented through the user interface of the spreadsheet-like document, such as in a table, graph, histogram, etc., in association with the BI document and the BI application.

Other implementations are also described and recited herein.

BRIEF DESCRIPTIONS OF THE DRAWINGS

FIG. 6 illustrates an example system that may be useful in implementing the described technology.

DETAILED DESCRIPTIONS

The described technology enhances a BI application by allowing designation of remote data and computations within a BI document. In this manner, the BI application can offload certain computations to remote data sources, thereby avoiding local data collection, transformation, storage, and computation at a local computing system for certain aspects of its operation. For example, circumstances may exist to make local storage and analysis of certain relevant data impractical (e.g., on a mobile device, a heavily loaded server, or a device not equipped with the best available solver). Accordingly, offloading certain computations on certain data to a remote system may improve resource utilization in a BI environment.

A BI document of the described technology can group arbitrary expressions (e.g., transformations) into individual entities, which can be connected as nodes in a graph, to compose the BI application. An output of one entity may be connected to the input of another entity to create a pipeline of expression-containing entities. Each entity may be designated for local or remote computation, independent of each other entity, and the expressions of each entity may be evaluated by either a local system or a remote system, depending on the designation of the entity. As such, the content and connections of each entity can combine to yield a sophisticated BI application specifying arbitrary combinations of local and remote computations using local and remote data sources.

It should be understood that data sources may emit either data (e.g., remotely-resident data, remotely-computed solutions) or expressions. For example, a data source may return data from a database residing at a remote data warehouse or may return solutions based on remote or local data, wherein the solutions were evaluated at a remote computing system. Where the remote computing system does not provide its own data, the data source may be referred to as a "pure solver." A data source that emits expressions may also be referred to as a "service."

Figure 1:
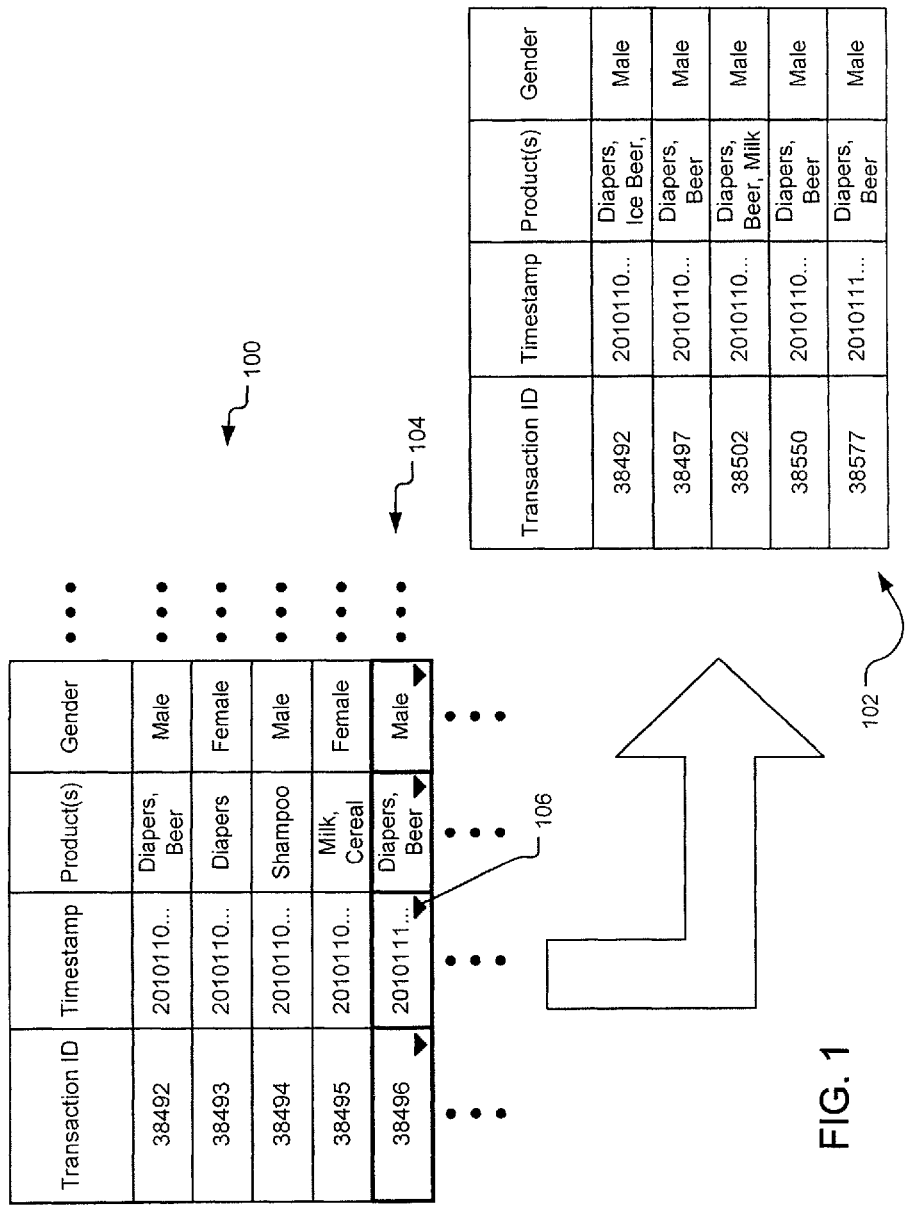
FIG. 1 illustrates a representation of data specified by an example BI document and a solution presentation based on a data mining assertion.

FIG. 1 illustrates a representation 100 of data specified by an example BI document and a solution presentation 102 based on a data mining assertion. Certain BI tools, such as a spreadsheet and document-authoring environments, can support an IW in creation and execution of a BI application defined by expressions. For example, such a BI tool (e.g., a spreadsheet-like software tool, a data visualization tool, etc.) can execute in a computing device on the BI document, which defines the BI application. It should be understood, however, that such BI tools may be executed on any number of different types of computing devices, including distributed groups of computing devices (e.g., in a data warehouse or a cluster of computers).

Furthermore, in the described technology, a user can articulate a hypothesis in the form of a data mining assertion to identify relationships within the data. An assertion mode in the BI tool allows a user to input a data mining assertion and then iterate through the data and expressions within the scope of the BI document. The solution presentation then displays the data that is within the scope of the BI document and further satisfies the data mining assertion (e.g., makes the assertion true).

The BI document defines the BI application using a data structure of arbitrary expressions that can be specified by a non-programmer. In one implementation, a BI application defined by sets of such arbitrary expressions are grouped into distinct entities, which may have input variables and output variables, wherein the relationships among inputs and outputs of these entities defined by the sets of expressions that define the entities. The expressions are generally not unique to any particular system but may be evaluated by either a local or remote system. However, an entity (and therefore the contained expressions) may be designated for local or remote computation on local or remote data, thereby directing computation to an appropriate system based on this designation.

Individual entities may be connected into a pipeline of entities, such that an output of one entity (e.g., an external equation set entity for remote computation) is connected to the input of another entity (e.g., an internal equation set entity of local computation), and so on. The input and output formats of connected entities are matched, such that the data output by one entity is compatible with the input format (e.g., schema) required by the entity to which that data is input. The pipeline-connection of multiple entities allows a user to specify a BI application for evaluating complex and arbitrary combinations of expressions using local or remote data and computation to obtain sophisticated BI solutions.

Furthermore, a non-programmer can develop a BI application defined by such expressions. In some implementations, the skill level adequate for a person to develop a BI application defined by expressions may be similar to the skill level adequate to use a spreadsheet software application, such as Microsoft EXCEL®.

An expression is a symbolic representation of a computation to be performed and may include operators and operands. Example operators of an expression may include without limitation mathematical operators (e.g., addition, subtraction, etc.), relational transformations (e.g., group, ungroup, join, filter, sort, etc.), aggregate transformations over nested structures (e.g., hierarchical filtering), classifiers (e.g., Bayesian algorithm that classified an unstructured set of data), BI aggregations and transformations, and arbitrary or customized transform expressions (e.g., sets of rules, equations, and/ or constraints). Example operands of an expression may include without limitation data (e.g., numbers or strings), hierarchical data (such as records, tuples, and sequences), symbols that represent data, and other expressions that resolve to specific data. An expression may thus be recursive in that an expression may be defined by other expressions.

For example, an expression may take the form of a symbolic representation of an algebraic expression, such as $x^2+2xy+y^2$, where x and y are symbols that represent data or other expressions. A symbol may represent any type of data, including without limitation an integer, a rational number, a string, a Boolean, a sequence of data (potentially infinite), a tuple, or a record. In some implementations, a symbol may also represent an irrational number, although in other implementation, a symbol may be prohibited from representing an irrational number. Any expression may take the form of an equation, such as $E=mc^2$, where E, m, and c are symbols representing data or other expressions. An expression may also take the form of a functional definition, such as $f(x)=x^2-1$, where $f$ is a symbol representing the function, x is a symbol representing an operand or argument of the function, and $x^2-1$ is an expression that defines the function. In addition, an expression may take the form of a function invocations, such as $f(3)$, which indicates that the function $f$ is to be invoked with an argument of "3".

An expression may be solved by an expression engine (see expression engine 216 in FIG. 2) to produce a result (e.g., a solution or output). For example, where the symbol x (which is itself an expression) represents the number "3" and the symbol y (which is also an expression) represents the number "2," the expression $x^2+2xy+y^2$ may be solved by replacing the symbols with the values they represent, e.g., $2^2+2\cdot2\cdot3+3^2$, and then applying the operators to the operands to solve the entire expression to equal "25." In another example, where m is a symbol representing the number "2" and c is a symbol representing the number "2," the expression E, defined above, may be solved by replacing E with its definition (e.g., $mc^2$), replacing the symbols m and c with the values they represent (e.g., $2\cdot3^2$) and applying the operators to the operands to solve the expression to equal "18."

In evaluating an expression, the expression engine may apply the operators to the operands to the extent that the operators and operands are defined and to the extent that the expression engine is configured to apply the operators to the operands. For example, where the symbol x represents the number "3" and the symbol "y" is not yet defined, the expression $x^2+2xy+y^2$ may be solved by replacing the known symbol "x" with the value it represents (e.g., $2^2+2\cdot2\cdot y+y^2$) and then applying the operators to the operands to solve the entire expression as $4+4y+y^2$. Where the symbol x represents the number "3" and the symbol y represents the string "hello", the expression $x^2+2xy+y^2$ may be solved as $4+4\cdot hello+hello^2$, since the expression engine may not be configured to perform arithmetic operations on the string "hello".

Each expression can further specify a data source, whether local or remote. For example, an expression in which data values for x are taken from a local data source and data values for y are taken from a remote data source may be declared as follows:

$x^2+2xy+y^2$|where x in local_table_contacts.Age and y in remote_table_contacts.Income Furthermore, each expression can further designate local or remote computation. For example, the computation entity may be specifically identified for an expression as such:

$x^2+2xy+y^2$|local_source.Solver or $x^2+2xy+y^2$|remote_source.Solver

In some implementations, expressions without a computation identifier are deemed local by default.

In some implementations, expression may be declarative. A declarative expression can identify a computation to be performed without specifying how to compute it. A declarative expression may be contrasted with an imperative expression, which may provide an algorithm or other specification for computing the expression. Declarative expressions may be input manually, such as into a field in a spreadsheet tool, or created through a declaration-generating control, such as a visual control element associated with a visualization.

In some implementations, expressions may be immutable. An expression is immutable if it cannot be changed. For example, once a definition is given to an immutable expression, such as if $E=mc^2$ is designated immutable, the expression E cannot later be given a different definition. One advantage of immutability is that a BI application having one or more expressions designated as immutable prevents users of the BI application from altering those expressions. Where expressions are being solved in a distributed execution environment, immutability may be advantageous in that devices can rely on the immutable expression having the same definition throughout the lifetime of the expression. Immutability of expressions can make it easier for independent parts of a BI application to execute in parallel.

As discussed, a BI application may be defined by a data structure of expressions. In one implementation, the BI application is represented by a graph of nodes or entities specified in the BI document, wherein one or more expressions are partitioned into individual entities and connected via related inputs and outputs. Based on the BI document, the BI application can provide spreadsheet-like, incremental recalculation behavior ("recalc"), solving expressions as the data upon which they depend changes. In addition, the BI tool and the BI document are coordinated to allow BI and other operations over heterogeneous complex data, including data sourced from local and remote data sources.

In one implementation, declarative expressions are recorded in the BI document to define one or more entities in the graph, each entity representing without limitation a data structure, an external data source, a control element, an external event source, a visualization, or an update service. In one implementation, each entity transforms its inputs (if any) into its outputs (if any) and is associated with:

zero or more inputs from other entities, each input configured to accept data from outputs of other entities;

transform expressions that take a set of inputs and create a collection; and zero or more outputs accessible by other entities, each output configured to emit output data generated by the entities transforms.

Figure 3:
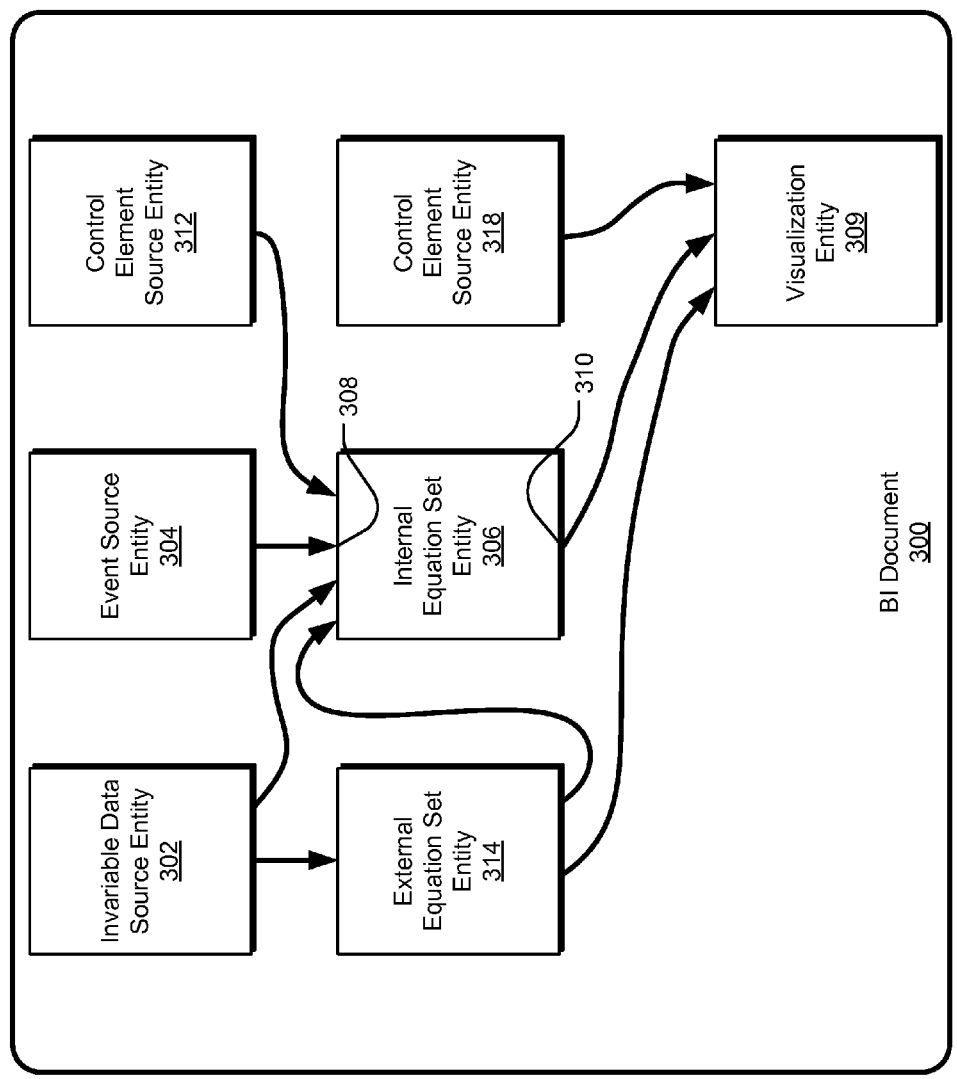
FIG. 3 illustrates an example BI document specifying a graph of connected entities (e.g., transformation nodes).

More details pertaining to entities are described with regard to FIG. 3.

The representation 100 displays data referenced by and resulting from a BI document. The BI document specifies data from designated data sources (local or remote) and expressions representing business logic that can be evaluated by an expression engine. (In one implementation, the BI document represents a form of an entity graph described in FIG. 3, although other data structures are also contemplated.) For example, a data source can provide data for the sequence of commercial transactions at a supermarket. Each transaction is designated with a transaction identifier (ID), a timestamp, a list of products purchased, the gender of the purchaser, etc. Business logic may be applied to the data to group, ungroup, join, filter, sort, or otherwise manipulate the data, such as to produce algorithmic solutions based on the data. The representation 100 may be displayed via a user interface of a spreadsheet tool, a visualization tool, a web page, etc.

In addition to displaying data, the user interface also provides a capability for specifying a data mining assertion (e.g., a hypothesis) to be tested within the scope of the BI document. For example, in the illustrated representation 100, a row 104 of data has been selected, as indicated by the bolder borders shown in that row. An assertion mode can be invoked on the selected row (e.g., via a toolbar button or menu item). In one aspect, the user can change the data of a given transaction to specify data for an assertion. For example, Transaction ID 38496 previously pertained only to "Diapers," but the user has changed the Product(s) data item in that record to "Diapers, Beers" to specify a data component of a data mining assertion.

Furthermore, the assertion mode decorates the cells in the row with controls (e.g., arrow 106), each control providing access to a menu of options. Example options may include without limitation:

No constraints
Invariant
Vary within constraints
Within a range
Within a domain
    Among data sharing a specified property value (e.g., "x is in all real numbers")
    Within a set (e.g., "x is in Monday, Tuesday, Wednesday, Thursday, Friday")
    Within an enumeration (e.g., "x is in 3, 5, 7, 11")

For example, the "Transaction ID" values may be designated as without constraint, the "Timestamp" values may be constrained to weekdays (Monday, Tuesday, Wednesday, Thursday, or Friday), the "Product(s)" may be constrained to those that contain both "Diapers" and "Beer," and the Gender may be unconstrained. (Other values of a transaction record may also be specified as part of the data mining assertion, but these constraints were omitted in this example. In one implementation, the default property is "unconstrained.") These selections assert a hypothesis that there exist one or more transactions that occur on a weekday and that include both diapers and beer. The data mining assertion instructs the BI application specified by the BI document to solve for the data mining assertion and display the solution in the solution presentation 102, which shows that based on the available data, all of the single transactions for both beer and diapers on a weekday were made by males. This solution is presented in association with the BI document and the BI application and reveals an apparent gender relationship pertaining to purchases of diapers and beer on weekdays. The solution presentation 102 may be displayed to replace the representation 100 or presented separately (e.g., in a separate worksheet or BI document).

In one implementation, the representation 100 annotates the "visible" data (e.g., the data values that are visible to a user in a current user interface view, present on a single page, or resident on a single worksheet) to indicate which data values may be changed for the purposes of data mining for a particular assertion. For example, such data values may be highlighted via a highlight color/style or border color/style to identify the data values that may be changed for the current assertion.

It should also be understood that, while the example shows a data mining assertion based on data variations, variations in transformation properties may also be asserted and constrained. As discussed, a BI document may specify transformations (e.g., in the form of expressions). Properties of such transformations can therefore be varied in a data mining assertion. For example, if an expression "0.5x=y" is specified as a transformation in a BI document, where x represents a total purchase price in each transaction and y represents the total wholesale cost in each transaction, the properties (e.g., coefficients) in the transformation can be designated for variation (e.g., the coefficient of x can be varied between 0.45 and 0.55 to assert a hypothesis about transactions having margins between 45% and 55%). Accordingly, a hypothesis can be tested by varying one or more expressions (e.g., transformation properties) within the scope of the BI document.

Another type of constraint may be applied to those data values that are not within the visible data. For example, when changing a visible data value relative to a current assertion, the user may limit the scope of the data values that may be varied to the data values that are "visible," as previously described. As such, data value variation can be constrained by a property identifying whether a particular data value is visible to the user in the current user interface view, page, or worksheet. If the data value is not visible, then it may be constrained as invariable.

A solution is computed from the data and transformation, subject to the variations and constraints, to yield a presentation of data that satisfies the data mining assertion. A data mining assertion can include just data variations, just expression variations, or both expression variations and data variations. For example, the beer/diapers assertion can be combined with the margin assertion to present transaction data in which both beer and diapers were purchased at a margin between 45% and 55%.

In another example (not shown), an assertion expression editor can be invoked to provide a user interface for specifying a data mining assertion to be evaluated against the scope of the BI document. In such an implementation, a user can enter a textual expression (e.g., a declaration or formula) representing the data mining assertion. For example, the user can represent the combined beer/diapers/margin assertion as:

Timestamp equals {Monday, Tuesday, Wednesday, Thursday, Friday} AND
Products(s) includes "Beer" and "Diapers" AND
Ax=y where 0.45<A<0.55

As both the assertion specified in row 104 and the assertion specified in the assertion expression editor above are equivalent, the solution presentation 102 also shows the data satisfying the data mining assertion specified using the assertion expression editor.

The examples above provided two possible implementations for articulating a data mining assertion to be applied to data and expressions specified by a BI document. Other mechanisms for articulating a data mining assertion may be employed.

Figure 2:
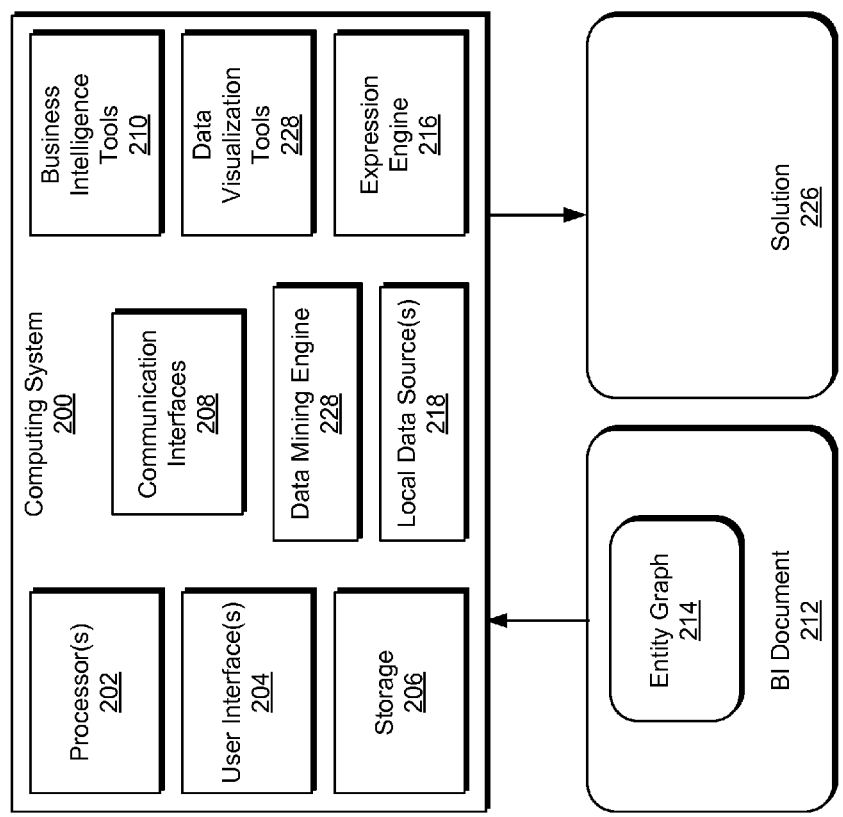
FIG. 2 illustrates an example computing system capable of data mining in a BI document.

FIG. 2 illustrates an example computing system 200 capable of data mining in a BI document. The computing system 200 includes components includes one or more processors 202, one or more user interfaces 204 (e.g., visual display interfaces, keyboard and mouse interfaces, touch screen interfaces, etc.), data storage 206, which may include memory as well as magnetic, optical, and solid state storage drives, and one or more communications interfaces 208 (e.g., wireless and/or wired networking interfaces). These components provide support for executing BI tools 210 (e.g., a spreadsheet tool) and data visualization tools 228 based on a BI document 212 that defines a BI application.

One of the BI tools 210 can input the BI document 212, process an entity graph 214 represented in the BI document 212, process data mining assertions, and invoke data mining operations. As discussed with regard to FIG. 3, the entity graph 214 represents one or more entities, each entity specifying one or more expressions and having one or more inputs and/or outputs, wherein the entities are connected between an input of one entity and an output of another entity.

In one implementation, the BI tool 210 analyzes the entity graph 214 and determines the data source designated to operate on each entity. Each entity designates data against which its expressions are to be evaluated. Some entities designate expressions for local computation on local data; other entities designate expression for remote computation on remote data. For local computation entities, the local computing system 200 employs a local expression engine 216, and one or more local data sources 218 to solve the expressions defined in the entities. It should be understood that "local" refers to data or computation within a device or a local area network (LAN) (e.g., at a local server), as compared with "remote," which refers to data or computation outside of a LAN, such as on a wide area network (WAN). Examples of remote data and computation would reside in the "cloud," such as at one or more Internet connected web services or data warehouses. A solution 226 of the BI application is output to the user, such as via a visualization (e.g., a map, a graph, etc.) displayed on a display device via one or more of the user interfaces 204.

In addition, the computing system 200 also includes a data mining engine 228 that manages the processing of data mining assertions, including the varying of data and/or expressions within the scope of the BI document 212. The data mining engine 228 can receive a data mining assertion through a user interface, such as a user interface executed by one of the business intelligence tools 210. The data mining engine 228 then determines the data and expressions variations available within the scope of the BI document 212 and within any constraints imposed by the user. The data mining engine 228 iterates through the variations to determine the data and transformations that would make the assertion true, presenting such data in a solution presentation. It should be understood that presenting can represent a display or other output, or preparing data for display or other output, such as generating a data object, file or signal for transmission to another system for display or other output.

FIG. 3 illustrates an example BI document 300 specifying a directed acyclic graph (DAG) of connected entities 302, 304, 306, 309, 312, and 314). Each entity is characterized by zero or more inputs (such as input 308), zero or more outputs (such as output 310), and a specified set of expressions (e.g., transforms) that can receive an input from another entity and/or create a collection for output to another entity.

Each entity can represent without limitation a data structure (e.g., a table or a hierarchical table), a terminal entity (e.g., a visualization or update service), a set of expressions with its bindings to identified data, an external data source (e.g., a remote data source, a query-able data source, a non-query-able data source, a control element that provides user interaction to allow data input, a remote service, etc.), and external event sources (e.g., timers). Each entity also defines the format of its one or more inputs and/or outputs. If the entity has an input, the entity further defines the source of the input data. The one or more expressions specified by each entity define transforms to be performed by the entity on its inputs (if any), the result of which is the output (if any) of the entity.

Individual entities may be characterized in a variety of ways, as described with regard to the example list below:

An equation set is represented as an entity having one or more inputs receiving data for computations and having one or more outputs for supplying the results of the computation to a subsequent entity in the directed graph, wherein the expressions specified by the entity represent the computations made on the input data to generate the output data.

An invariable data source may be represented as an entity with no inputs and an output capable of supplying data to a subsequently connected entity.

An external event source is also represented as an entity with no inputs and an output supplying the data resulting from an event (e.g., a timer event indicating that a timer identifies a current date or time, a user input event indicating that a user has entered the number '3'). An external event source is distinguished from an invariable data source because its output may change based on the state of the particular event.

A visualization is represented as an entity with inputs but no outputs (e.g., a terminal entity). A bar chart visualization, for example, may be represented as an entity having one input supplying its title and another input receiving a collection of pairs of categories and values.

An interactive control element may be specified by associating a visualization entity with an external data source entity representing a control element source entity. The control element source entity has no inputs and an output that supplies values corresponding to the user's manipulation of a displayed control element. By manipulating the associated control element (e.g., moving a slider in a single slider control element), the user causes data to be emitted from the output of control element source entity, which can then be connected to the input of a visualization entity to cause the slider movement to be presented visually to the user. An output of the control source entity would commonly also be input to an equation set, for example, to influence associated computations and potentially other visualizations, although other connections are also contemplated.

An updateable source/sink may also be specified by a pair of entities—a "source" entity, which accepts queries as inputs and emits query results as outputs and a "sink" entity representing a destination to which the query results (e.g., "updates") are output. In this manner, the entities represent in combination a single updatable data source/sink that is similar to the invariable data source but which reflects data changes based on changes in underlying data and the queries it receives.

It should be understood that other types of entities and connections are also contemplated in other implementations. In particular, multiple entities may be connected in a pipeline to produce a complex and arbitrary sequence of expressions designated for local and/or remote computation.

As data that is input to an entity changes, the expression engine re-evaluates the expressions specified by the entity. Accordingly, data changes and re-computation results can ripple through the directed graph, changing the output data that is altered by the re-computations and leaving the outputs of other entities unchanged (where the initial data changes do not ripple to these entities). This incremental change provides a spreadsheet-like recalculation ("recalc") effect—some data changes in the spreadsheet when data is changed, while other data remains unchanged.

Turning back to FIG. 3, the entity 302 represents an invariable data source, having one output but no input, and the entity 304 represents an event source, also having one output but no input, and further having output data that depends on the state of an event. Both the invariable data source entity 302 and the event source entity 304 supply their outputs to an internal equation set entity 306, which specifies one or more expressions for transforming the received data to output data of the entity 306. In this example, the expressions of the internal equation set entity 306 specify local computation and data, not remote computation and data. In contrast, another equation set entity, i.e., external equation set entity 314, specifies one or more expressions designating an external data source. As such, the expressions specified by the entity 314 are communicated to the designated external (e.g., remote) data source for remote computation on remote data. The solutions generated by the remote computation are communicated back to the local computing system for binding to the entity graph.

A control element source entity 312 also has no input and one output. The output data of the control element source entity 312 changes based on the state of an associated control element (e.g., a visual slider control), which can be manipulated by a user. For example, the associated control element may be presented to the user as a slider that the user can slide back and forth within a predetermined range to change the output value of the entity 312. A control element source entity 318 is also connected to the input of a visualization entity 309.

As illustrated, individual entities may be connected into a pipeline, where the local or remote location of the data and the computation for one entity are immaterial to any previous or subsequent entity in the pipeline. For example, an output of the invariable data source entity 302 is connected to the external equation set entity 314 and an output connected to the internal equation set entity 306. The external equation set entity 314 has one output connected to an input of the internal equation set entity 306. It should be understood that the input and output formats of connected entities are compatible to allow a first entity to output data directly to a second entity.

Further, among other connections, inputs to the internal equation set entity 306 are connected to outputs of the invariable data source entity 302, the event source entity 304, and the control element source entity 312. Also, as shown, outputs of the entities 306, 314 and 318 are input to the visualization entity 30, which has three inputs and no outputs. The visualization entity 309 alters a visualization presented to the user based on the data received at its inputs from the entities 306, 314, and 318. In this manner, changes to the outputs of the entities 306, 314, and 318 results in changes to the visual display viewed by user.

Figure 4:
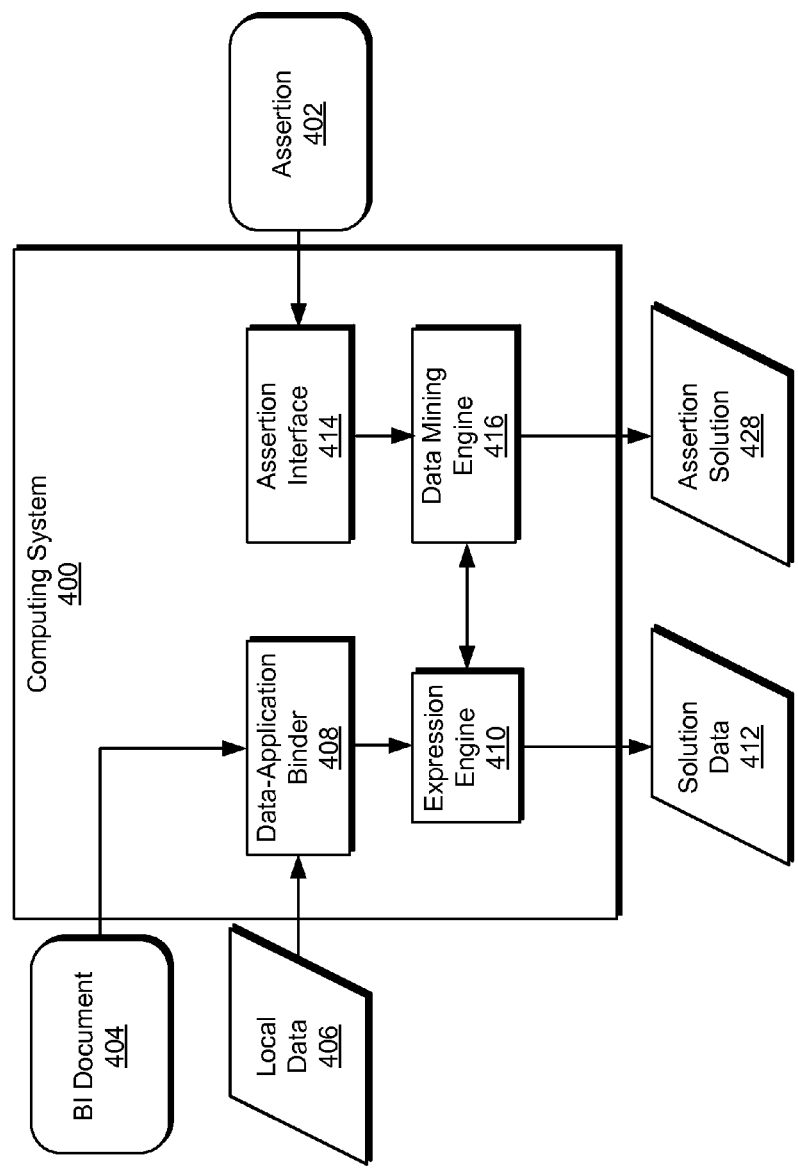
FIG. 4 illustrates a computing system for solving a data mining assertion within the scope of a BI document.

FIG. 4 illustrates a computing system 400 for solving a data mining assertion 402 within the scope of a BI document 404. Data values and expression properties are varied (within the specified constraints) across other corresponding data/expression specified in the BI document. For example, if the transaction data only includes data from Tuesdays through Sundays, then the variations in the timestamp (constrained to weekdays) would only include Tuesday, Wednesday, Thursday, and Friday.

The BI document 404 and local data 406 are received by a data-application binder 408, which binds the local data 406 to the expressions specified in the BI document 404 and passes the expressions to an expression engine 410 to evaluate the expression based on the available data. It should be understood that remote data and/or remote computations may also be specified by the BI document 404, such that the intermediate solutions arising from the remote data and/or computations are also bound to the expressions of the BI document by the data-application binder 408. The expression engine 410 produces solution data 412 based on available data (such as solution data presented in the representation 100 of FIG. 1, a visualization, etc.).

If the user wishes to test a hypothesis about the data, the user can invoke an assertion mode in the computing system 400, such as via a user interface of a BI tool or a BI application defined by the BI document 404. Within the assertion mode, the user can input a data mining assertion 402 through an assertion interface 414 (e.g., an expression editor). The data mining assertion 402 articulates the hypothesis with one or more constraints on variations of data and/or expressions. A data mining engine 416 then induces variations in the data and/or expressions identified in the data mining assertion 402 within the specified constraints to produce an assertion solution 428 that includes the data that makes the assertion true (e.g., a table of all of the transaction data that satisfies the hypothesis).

Figure 5:
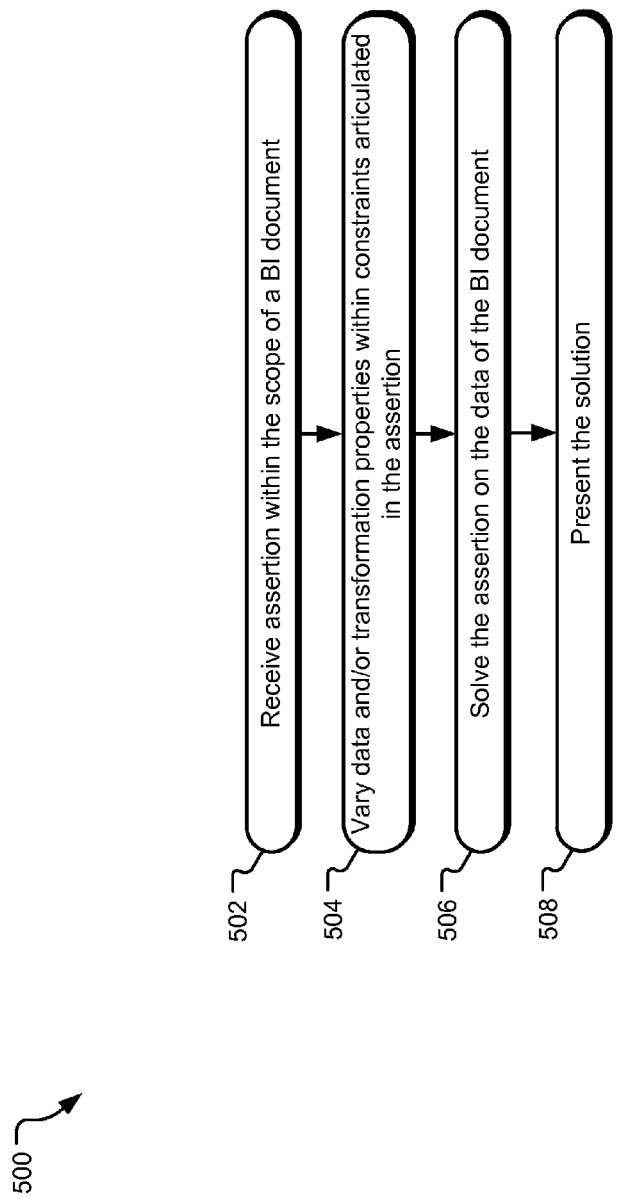
FIG. 5 illustrates example operations for solving a data mining assertion within the scope of a BI document.

FIG. 5 illustrates example operations 500 for solving a data mining assertion within the scope of a BI document. A receiving operation 502 receives a data mining assertion within the scope of the BI document. In one implementation, a user can designates constraints on data and/or expression properties specified by the BI document. In another implementation, a user can invoke an assertion editor to allow the user to specify constraints on data and/or expression properties specified in the BI document.

A variation operation 504 varies data and/or expression properties within constraints articulated in the data mining assertion. With regard to data and/or expression properties for which constraints have been specified, the variation operation 504 varies the data in accordance with the specified constraints (e.g., to equal those data values and/or expression properties specified by the BI document that satisfy the constraints). A solver operation 506 solves the data mining assertion within the specified constraints. For example, if a particular data item (e.g., purchase price) has values between $5 and $500 but the user has imposed a constraint limiting the data item to between $100 and $500, then the data mining assertion will only be true for transactions having a purchase price between $100 and $500.

With regard to data and/or expression properties for which constraints have not been specified, the variation operation 504 varies the data within the scope of the document (e.g., to equal all data values and/or expression properties specified by the BI document). For example, if a particular data item (e.g., purchase price) has values between $5 and $500 and the user has imposed no constraint, then the solver operation 506 can determine that the data mining assertion is true at any purchase price, if all other conditions of the data mining assertion are true for a given transaction.

A presentation operation 508 presents the data that makes the data mining assertion true. For example, a new worksheet can be generated to display the solution. In another example, a histogram, line graph, or other graphical solution may be presented.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an expression engine, a data mining engine, an assertion interface, a data-application binder, a data source, and other modules and services may be embodied by instructions stored in memory 22 and/or storage devices 29 or 31 and processed by the processing unit 21.

Source data, BI documents, data mining assertions, and other data may be stored in memory 22 and/or storage devices 29 or 31 as persistent datastores. Further, local computing systems, remote data sources and/or services, and other associated logic represent hardware and/or software configured to provide BI functionality for network-connected systems. Such sources and services may be implemented using a general purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   offloading data computation to a remote system in a business intelligence environment;
   receiving, from a user interface displaying data of a business intelligence document, a data mining assertion associated with the business intelligence document to identify relationships within the data, wherein the user interface displays the data of the business document in a tabular form comprising a plurality of cells displaying one or more data values and expressions disposed in a plurality of rows and columns, and wherein the data mining assertion is received in one or more cells of a row displaying at least one data value or at least one expression of the business intelligence document, wherein each cell of the row is capable of specifying a different component of the data mining assertion and each cell of a column is capable of specifying only a same component of the data mining assertion, the business intelligence document specifying a directed acyclic graph connected of entities in a pipeline to produce a complex and arbitrary sequence of expressions designated for the computation;
   varying, in the same user interface, the at least one data value and the at least one expression of the one or more cells of the row subject to the data mining assertion;
   solving the data mining assertion within a specified constraint based on the varying to identify individual data values that cause the data mining assertion received from the user interface to evaluate the data value and expressions variations available within the scope of the business intelligence document to iterate through the variations to determine the data and transformations that make the assertion true;
   presenting a solution of the solving in the same user interface by replacing the plurality of cells with the solution, the solution comprising a second plurality of cells displaying one or more data values or expressions disposed in the plurality of rows and columns; and
   receiving the data mining assertion by invoking an assertion mode on the row using a toolbar button or a menu item of the user interface associated with the business intelligence document, wherein the assertion mode provides a control on each cell of the row.

2. The method of claim 1 wherein a constraint restricts the varying of the at least one data value or the at least one expression within a range.

3. The method of claim 1 wherein a constraint restricts the varying of the at least one data value or the at least one expression within a predetermined set of possible data values or possible expressions, respectively.

4. The method of claim 1 wherein a constraint restricts the varying of the at least one data value or the at least one expression within a predetermined domain.

5. The method of claim 1 wherein the user interface annotates a set of the displayed one or more data values or expressions, disposed in the plurality of rows and columns, that can be varied for the data mining assertion.

6. The method of claim 1 wherein the data mining assertion specifies a constraint preventing varying of another data value or another expression specified by the business intelligence document.

7. The method of claim 1 wherein a constraint defines the at least one data value as invariant when the at least one data value is not visible.

8. The method of claim 1, further comprising annotating invariant data values to indicate associated invariant status.

9. One or more computer storage memories, the memories being articles of manufacture, storing computer-executable instructions for executing, on a computer system, a computer process comprising:
   offloading data computation to a remote system in a business intelligence environment;
   receiving, via a user interface displaying data of a business intelligence document, a data mining assertion associated with the business intelligence document to identify relationships within the data, wherein the user interface displays the data of the business document in a tabular form comprising a plurality of cells displaying one or more data values and expressions disposed in a plurality of rows and columns, and wherein the data mining assertion is received in one or more cells of the plurality of cells, wherein the plurality of cells displayed in the user interface are capable of receiving the data mining assertion based on one or more user inputs, the business intelligence document specifying a directed acyclic graph connected of entities in a pipeline to produce a complex and arbitrary sequence of expressions designated for the computation;
   varying, via the user interface, the one or more data values and expressions of the one or more cells subject to the data mining assertion associated;
   solving the data mining assertion within a specified constraint based on the varying to identify individual data values that cause the data mining assertion received via the user interface to evaluate the data value and expressions variations available within the scope of the business intelligence document to iterate through the variations to determine the data and transformations that make the assertion true;

presenting a solution of the solving in the user interface, the solution comprising a second plurality of cells displaying one or more data values or expressions disposed in the plurality of rows and columns; and receiving the data mining assertion by invoking an assertion mode on the row using a toolbar button or a menu item of the user interface associated with the business intelligence document, wherein the assertion mode provides a control on each cell of the row.

10. The one or more computer storage memories of claim 9 wherein the constraint defines a range on a coefficient in the expression and the varying comprises varying the coefficient within the range to evaluate the data mining assertion.

11. The one or more computer storage memories of claim 9 wherein the constraint restricts the varying of at least one data value or at least one expression specified by the business intelligence document within a range.

12. The one or more computer storage memories of claim 9 wherein a constraint restricts the varying of at least one data value or at least one expression within a predetermined set of possible data values or possible expressions, respectively.

13. The one or more computer storage memories of claim 9 wherein a constraint restricts the varying of at least one data value or at least one expression within a predetermined domain.

14. The one or more computer storage memories of claim 9 wherein a constraint restricts the varying of at least one data value or a property of the at least one expression.

15. The one or more computer storage memories of claim 9 wherein a same data mining assertion is received by varying, in the one or more cells, the displayed one or more data values or expressions and by invoking a second user interface for specifying the same data mining assertion.

16. A computing system comprising:

a user interface displaying data of the business document in a tabular form comprising a plurality of cells displaying a plurality of data values or expressions disposed in a plurality of rows and columns, and further receiving a data mining assertion associated with a business intelligence document in at least two cells of the plurality of cells to identify relationships within the data, wherein each cell of the at least two cells displays at least one data value or expression specified by the business intelligence document, the business intelligence document specifying a directed acyclic graph connected of entities in a pipeline to produce a complex and arbitrary sequence of expressions designated for computation;

a data mining engine varying the at least one data value or expression in each cell of the at least two cells subject to the data mining assertion associated with the business intelligence document, wherein the data mining assertion specifies a constraint on the at least one data value or the at least one expression specified by the business intelligence document;

an expression engine varying the at least one data value or expression to identify individual data values that cause the data mining assertion to evaluate the data value and expressions variations available within the scope of the business intelligence document to iterate through the variations to determine the data and transformations that make the assertion true;

a presentation tool presenting a solution reflecting the individual data values that cause the data mining assertion to evaluate to true, the solution being presented in association with the business intelligence document via the user interface;

wherein the computing system offloads data computation to a remote system in a business intelligence environment, and receives a data mining assertion by invoking an assertion mode on a row using a toolbar button or a menu item of the user interface, wherein the assertion mode provides a control on each cell of the row; and one or more processors configured to execute at least the data mining engine.

17. The computing system of claim 16 wherein the data mining assertion associated with the business intelligence document includes both data variations and expression variations.

18. The computing system of claim 16 wherein the expression engine restricts an extent to which the at least one data value or at least one expression is varied based on the constraint.

19. The computing system of claim 16 wherein the data mining assertion specifies another constraint to prevent varying of another data value or another expression specified by the business intelligence document, and the expression engine identifies the individual data values without varying the another data value or the another expression.

\* \* \* \* \*